(12) United States Patent
Handel et al.

(10) Patent No.: US 7,742,954 B1
(45) Date of Patent: Jun. 22, 2010

(54) METHOD AND SYSTEM FOR AN ENHANCED PORTAL FOR SERVICES SUPPLIERS

(75) Inventors: Sean Handel, Moss Beach, CA (US); Shantanu Patwardhan, Cupertino, CA (US); Satnam Alag, Santa Clara, CA (US); Mark Orttung, Menlo Park, CA (US)

(73) Assignee: Rearden Commerce, Inc., Foster City, CA (US)

( * ) Notice: Subject to any disclaimer, the term of this patent is extended or adjusted under 35 U.S.C. 154(b) by 1346 days.

(21) Appl. No.: 11/178,006

(22) Filed: Jul. 7, 2005

(51) Int. Cl.
*G06F 17/30* (2006.01)

(52) U.S. Cl. .......................... 705/27; 705/26

(58) Field of Classification Search .............. 705/26, 705/27
See application file for complete search history.

(56) References Cited

U.S. PATENT DOCUMENTS

| | | | |
|---|---|---|---|
| 5,513,126 | A | 4/1996 | Harkins et al. |
| 5,892,909 | A | 4/1999 | Grasso et al. |
| 5,966,658 | A | 10/1999 | Kennedy et al. |
| 6,009,408 | A | 12/1999 | Buchanan |
| 6,091,956 | A | 7/2000 | Hollenberg |
| 6,157,945 | A | 12/2000 | Balma et al. |
| 6,249,252 | B1 | 6/2001 | Dupray |
| 6,253,369 | B1 | 6/2001 | Cloud et al. |
| 6,292,830 | B1 | 9/2001 | Taylor et al. |
| 6,317,686 | B1 | 11/2001 | Ran |
| 6,336,072 | B1 | 1/2002 | Takayama et al. |
| 6,397,191 | B1 | 5/2002 | Notaini et al. |
| 6,591,263 | B1 | 7/2003 | Becker et al. |
| 6,741,969 | B1 | 5/2004 | Chen et al. |
| 6,804,658 | B2 | 10/2004 | Lim et al. |
| 6,837,427 | B2 | 1/2005 | Overhultz et al. |
| 6,980,993 | B2 | 12/2005 | Horvitz et al. |
| 7,013,149 | B2 | 3/2006 | Vetro et al. |
| 7,035,811 | B2 | 4/2006 | Gorenstein |
| 7,072,886 | B2 | 7/2006 | Salmenkaita et al. |
| 7,124,024 | B1 | 10/2006 | Adelaide et al. |
| 7,139,978 | B2 | 11/2006 | Rojewski |
| 7,194,417 | B1 | 3/2007 | Jones |
| 7,280,823 | B2 | 10/2007 | Ternullo et al. |
| 7,283,970 | B2 | 10/2007 | Cragun et al. |
| 7,284,002 | B2 | 10/2007 | Doss et al. |
| 7,289,812 | B1 | 10/2007 | Roberts et al. |
| 7,296,017 | B2 | 11/2007 | Larcheveque et al. |

(Continued)

OTHER PUBLICATIONS

Windley, Phillip; "Web services get VAN boost," InfoWorld, Jan. 12, 2004, v26n2pp34-35; Dialog file 15 #02685325, 5pgs.*

(Continued)

*Primary Examiner*—Robert M. Pond
(74) *Attorney, Agent, or Firm*—Greenberg Traurig, LLP

(57) ABSTRACT

A system and method for providing an enhanced, automated qualifying process that can do an automated or partially automated evaluation of new supplier and provide different levels of certification as a result. In another embodiment, the system and method can supply a collaboration toolkit for the supplier to interact in an automated way with the service supplier and its customers. Furthermore, in another embodiment, the support functions in the portal may be used to simplify or automate interactions, in particular with small, independent contractors that do not have a large in-house Information Technology department.

21 Claims, 3 Drawing Sheets

U.S. PATENT DOCUMENTS

| | | |
|---|---|---|
| 7,330,112 B1 | 2/2008 | Emigh et al. |
| 7,376,735 B2 | 5/2008 | Straut et al. |
| 7,394,900 B1 | 7/2008 | Gerber et al. |
| 7,409,643 B2 | 8/2008 | Daughtery |
| 7,426,537 B2 | 9/2008 | Lee et al. |
| 7,430,724 B2 | 9/2008 | Othmer |
| 7,441,203 B2 | 10/2008 | Othmer et al. |
| 2001/0029425 A1 | 10/2001 | Myr |
| 2002/0010604 A1 | 1/2002 | Block |
| 2002/0026356 A1 | 2/2002 | Bergh et al. |
| 2002/0049644 A1 | 4/2002 | Kargman |
| 2002/0072938 A1 | 6/2002 | Black et al. |
| 2002/0099613 A1 | 7/2002 | Swart et al. |
| 2002/0116266 A1 | 8/2002 | Marshall |
| 2002/0143655 A1 | 10/2002 | Elston et al. |
| 2002/0156659 A1 | 10/2002 | Walker et al. |
| 2002/0178034 A1 | 11/2002 | Gardner et al. |
| 2003/0023499 A1 | 1/2003 | Das et al. |
| 2003/0028390 A1 | 2/2003 | Stern et al. |
| 2003/0033164 A1 | 2/2003 | Faltings |
| 2003/0050964 A1 | 3/2003 | Debaty et al. |
| 2003/0120530 A1 | 6/2003 | Casati et al. |
| 2003/0126095 A1 | 7/2003 | Allen |
| 2003/0126205 A1 | 7/2003 | Lurie |
| 2003/0187705 A1 | 10/2003 | Schiff et al. |
| 2003/0200146 A1 | 10/2003 | Levin et al. |
| 2003/0208754 A1 | 11/2003 | Sridhar et al. |
| 2003/0220835 A1 | 11/2003 | Barnes, Jr. |
| 2003/0229900 A1 | 12/2003 | Reisman |
| 2003/0233278 A1 | 12/2003 | Marshall |
| 2004/0088107 A1 | 5/2004 | Seligmann |
| 2004/0128196 A1 | 7/2004 | Shibuno |
| 2004/0193432 A1 | 9/2004 | Khalidi |
| 2004/0215517 A1 | 10/2004 | Chen et al. |
| 2004/0225540 A1 | 11/2004 | Waytena et al. |
| 2005/0010472 A1 | 1/2005 | Quatse et al. |
| 2005/0043974 A1 | 2/2005 | Vassilev et al. |
| 2005/0071245 A1 | 3/2005 | Norins et al. |
| 2005/0138187 A1* | 6/2005 | Breiter et al. ............... 709/229 |
| 2005/0209772 A1 | 9/2005 | Yoshikawa et al. |
| 2005/0227712 A1 | 10/2005 | Estevez et al. |
| 2005/0273373 A1 | 12/2005 | Walker et al. |
| 2006/0004511 A1 | 1/2006 | Yoshikawa et al. |
| 2006/0020565 A1 | 1/2006 | Rzevski et al. |
| 2006/0041477 A1 | 2/2006 | Zheng |
| 2006/0206412 A1 | 9/2006 | Van Luchene et al. |
| 2006/0235754 A1 | 10/2006 | Walker et al. |
| 2006/0247954 A1 | 11/2006 | Hunt |
| 2007/0016514 A1 | 1/2007 | A-Abdulqader et al. |
| 2007/0033087 A1 | 2/2007 | Combs et al. |
| 2007/0143153 A1 | 6/2007 | Ashby et al. |
| 2007/0162301 A1 | 7/2007 | Sussman et al. |
| 2007/0162328 A1 | 7/2007 | Reich |
| 2009/0030609 A1 | 1/2009 | Orttung |
| 2009/0030742 A1 | 1/2009 | Orttung |
| 2009/0030769 A1 | 1/2009 | Orttung |
| 2009/0101710 A1 | 4/2009 | Chakravarthy |

OTHER PUBLICATIONS

Business Editors, "Restaurant Row Selects ServeClick from Connectria to Power its Advanced Online Restaurant E-scheduling," Business Wire, New York, Feb. 1, 2000.

Orbitz, LLC, search results of online search for flights at www.orbitz.com, Mar. 11, 2009.

Reed, Dan et al., "More people find ways to squeeze fun into work trips; For many business travelers, taking family or friends on a trip at relatively low cost has become a handy job perk," USA Today, McLean VA, May 20, 2003, p. E12.

Sharkey, Joe, "Leisure activities are increasingly being fitted in to help make life on the road less of a grind," The New York Times, New York, N.Y., Apr. 18, 2001, p. C6.

Smith, Calvin et al., "The Talaris Services Business Language: A Case Study on Developing XML Vocabulaires Using the Universal Business Language," School of Information Management & Systems, University of California, Sep. 2002, pp. 1-16.

Kanaley, Reid, "More Ways Than One to Access Crowded AOL," Philadelphia Enquirer, Jan. 16, 1997, p. F1.

* cited by examiner

METHOD AND SYSTEM FOR AN ENHANCED PORTAL FOR SERVICES SUPPLIERS

BACKGROUND OF THE INVENTION

In the business area of qualifying suppliers of goods and services, methods and systems are known in current art that allow customers of a supplier service to invite suppliers to join a network of suppliers, and that also allow the supplier to add himself to the network through a self-service mechanism, and further, that allow the supplier to start collaborating and transacting with participants on the network once the supplier has been certified.

The currently known invitation process allows a company who is a customer of a supplier service, such as Rearden Commerce, or Rearden Commerce itself, to use the supplier portal service to send an email or other type of communication (letter, phone call, etc.) to indicate to the supplier that someone wishes them to join the network and begin transacting. The invitation may contain a custom message and other information provided by the supplier service and the inviter.

The supplier representative may be able to click on something in the email invitation that takes him to a web page hosted by the supplier service, where he can fill out an electronic application to join the network. This application may contain information about Service Level Agreements (SLAB), transaction types, transaction methods, billing process, technical integration agreements, etc.

What is clearly needed is a system and method for an enhanced, automated qualifying process that can do an automated or partially automated evaluation of the supplier and provide different levels of certification as a result; and further, a system and method that can then supply a collaboration toolkit for the supplier to interact in an automated way with the supplier service and its customers. Furthermore, support functions in the portal may be used to simplify or automate interactions, in particular with small, independent contractors that do not have a large in-house Information Technology department.

SUMMARY OF THE INVENTION

One embodiment as described herein provides a system and method for providing an enhanced, automated qualifying process that can do an automated or partially automated evaluation of new supplier and provide different levels of certification as a result. In another embodiment, the system and method can supply a collaboration toolkit for the new supplier to interact in an automated way with the service supplier and its customers. Furthermore, in another embodiment, the support functions in the portal may be used to simplify or automate interactions, in particular with small, independent contractors that do not have a large in-house Information Technology department.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
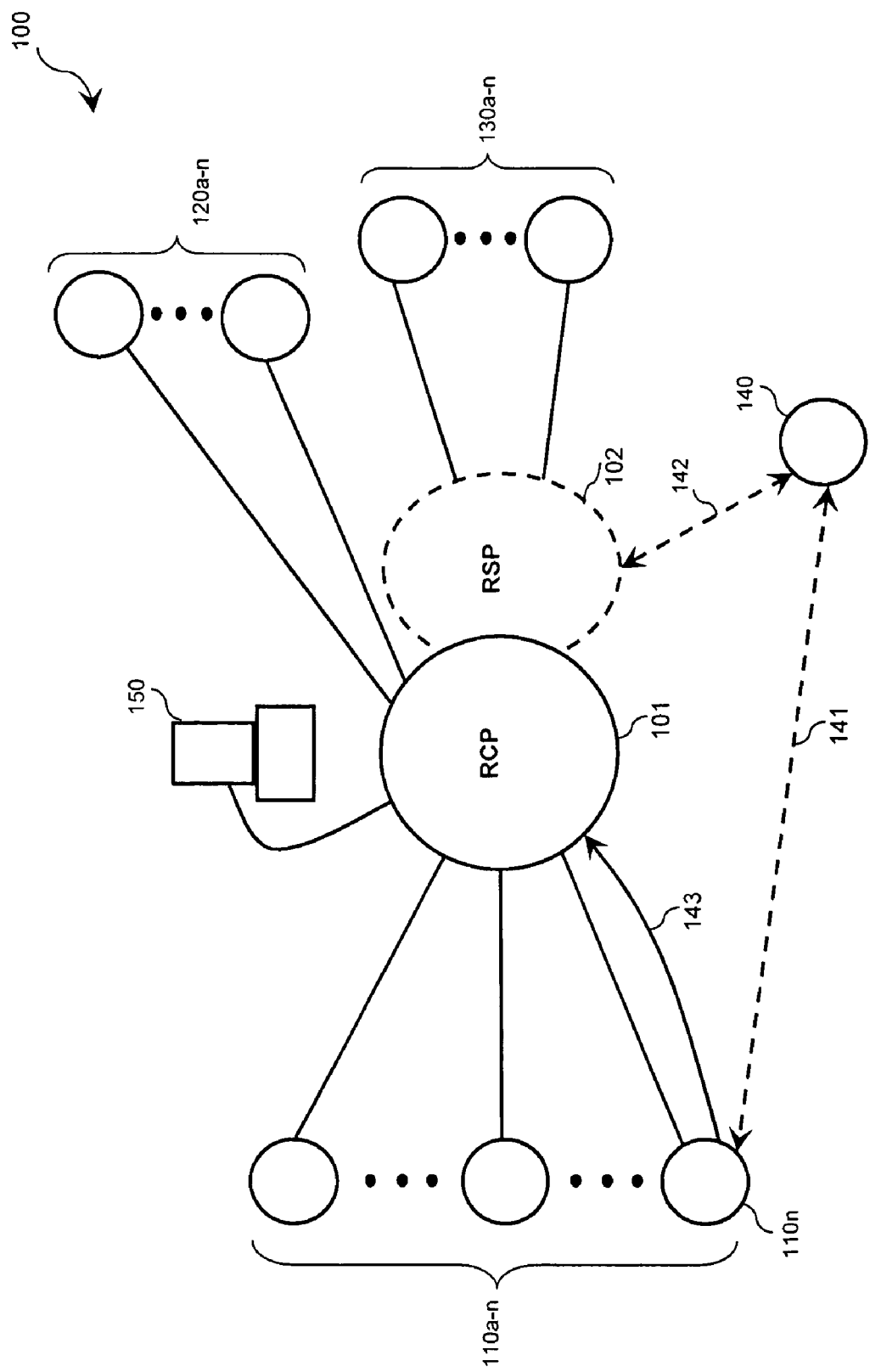
FIG. 1 shows an exemplary overview 100 of a service supplier Platform SSP, in accordance with one embodiment.

FIG. 1 shows an exemplary overview 100 of a Rearden Commerce Platform RCP 101, otherwise referenced herein as service supplier, service supplier portal, and service supplier platform. Customers 110*a-n* are connected to RCP 101. Also shown is Rearden Supplier Model RSP 102 that is the primary point of connection for suppliers. In this example several suppliers are shown, namely suppliers 23-120*a-n*, which connect directly to RCP 101 the portal RSP 23-102 (for example, legacy suppliers, large corporate suppliers, etc.), and a second group of suppliers 130*a-n*, which in this example connect to RSP 102. Also shown is a new supplier 140. He was invited by customer 110*n*, who sent an invitation request 143 to the RCP 101. In some cases, an automatic approval of the invitation request may be issued, or in other cases, the request may be reviewed by an agent using a workstation such as 150 to review invitation requests. More detailed examples follow below. The invitation 143 is then extended to supplier, who can then use the portal to register and become activated, as further described below.

As an example of the invitation and certification process, if a supplier is invited by a customer of the service supplier, but the service supplier does not see fit to open up the supplier to broader access to the service supplier customer base, then the supplier can be certified to transact with just that one customer until they make needed improvements to their processes, technology, financial condition or other aspects of their business. Once the supplier makes necessary changes, they can re-apply for broader certification. Certification requests can be limited to n number within a time period or n days between certification requests.

Once the supplier registers itself into the network, tools would be provided to the supplier. The collaboration toolkit would provide a way for the supplier to interact in an automated way with the service supplier and its customers for setting up meetings, viewing each other's calendars, sending emails, accessing private and public address books and collaborating on the setup process for the customer-service supplier-supplier connection.

Another tool would be a set of SBL documents and a supplier portal that allows transactions to flow from customer through the service supplier to supplier and back. These SBL documents are covered in a separate patent application, but the general idea is that they are a predefined set of XML documents used as a communication mechanism for transactions. These documents contain a general wrapper for service transactions but can be customized for each industry, application or document type.

The transactional part of the supplier portal would allow the supplier to interact with the service supplier in a fully automated or partially automated manner. For example, a partially automated process would include a structured email that is sent to the supplier each time a customer wants to make a reservation request. The supplier is given n minutes to respond to the request before it is rescinded. If the supplier wishes, he can set auto-respond rules in his transaction portal that allow him to accept or decline, or request more information for these transactions.

Mapping of transaction data between customers and suppliers can be done in an easier manner through the service supplier. A best-match algorithm would allow a best-guess approximation of a mapping for all fields in an application document. For example, the set of temporary worker job titles varies widely among corporate customers and suppliers of temporary workers. There is no standard, agreed-upon taxonomy for this mapping. Therefore, a best-match algorithm that is based on such things as natural language parsing, a pre-built standard taxonomy and other technologies would reduce the amount of time needed to do this mapping.

All suppliers that are in the service supplier platform would plug into a generalized reporting and data analytics engine that would allow end users to see how the supplier has been performing. For example, a user may query the engine, "What was the average response time?" This function can be provided anonymously using aggregate data collected across customers. the service supplier Platform will also monitor the service levels—the amount of time required to process a request—for the providers to ensure that they meet the agreed upon Service Level Agreements (SLAs). The supplier can sign up for automated alerts from the system when their Service Levels drop to configured thresholds.

Customers could rate the suppliers based on their interaction and these reviews would be available to the end customer before they select a supplier.

Figure 2:
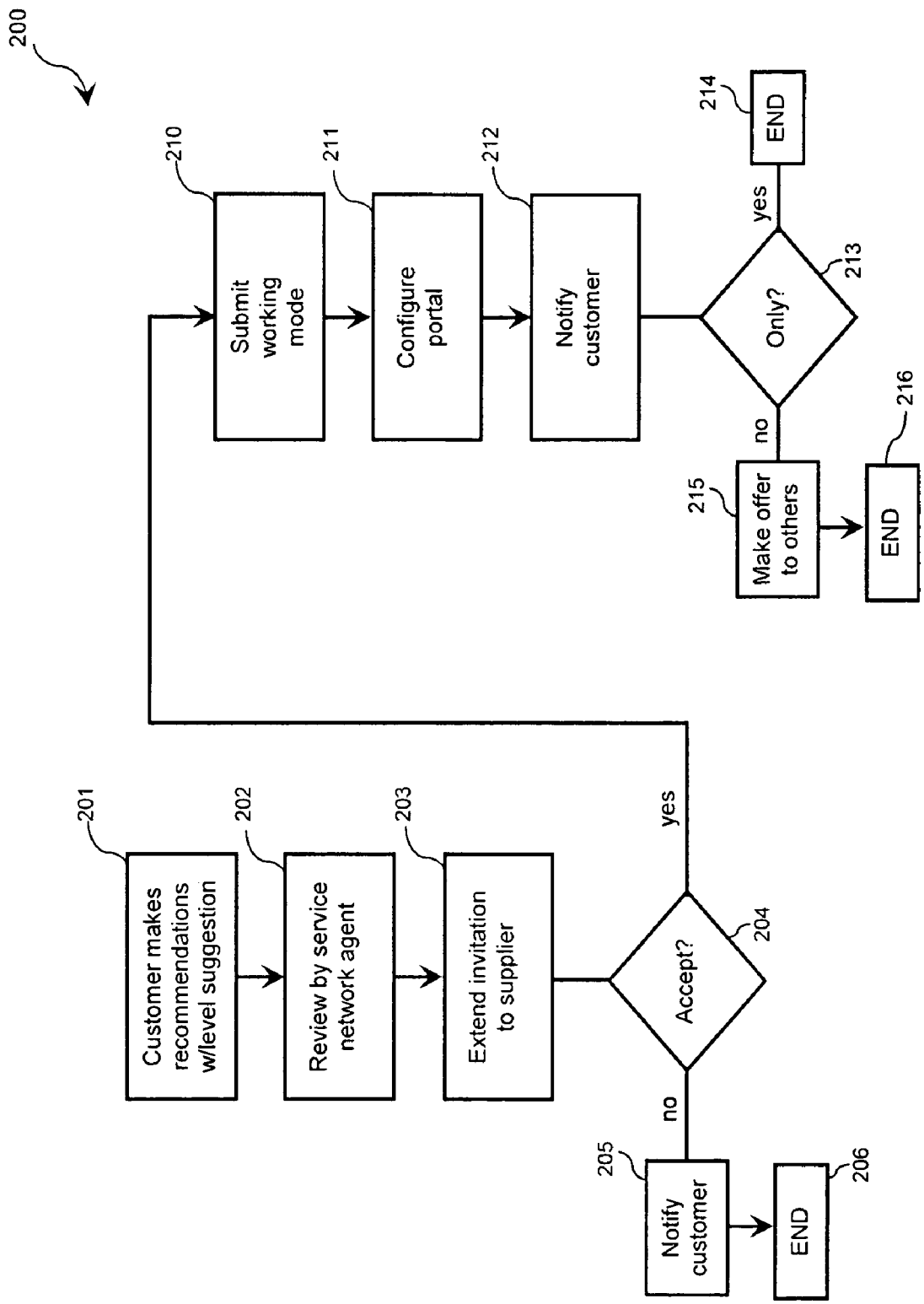
FIG. 2 shows an exemplary flow 200 of the process of qualifying a new service supplier in accordance with one embodiment.

FIG. 2 shows an exemplary flow 200 of the process of qualifying a service provider of goods and services according to the novel art of this disclosure. In step 201, a customer of a service supplier recommends a service provider for acceptance in the service supplier network. The customer, in the recommendation, specifies in which of a variety of levels of certification he feels the service provider should be placed. In step 202, an agent of the service network, using an automated or partially automated evaluation process, reviews the qualifications of the recommended service provider and recommends some level of certification as a result. For example, if a service provider is invited by a customer of the network, but the network does not see fit to open up the supplier to broader access to its customer base, then the service provider can be certified to transact with just that one customer until they make needed improvements to their processes, technology, financial condition or other aspects of their business. Once the service provider makes necessary changes, they can re-apply for broader certification. In some cases, certification requests can be limited to, for example, a specific number n within a time period or n days between certification requests.

In step 203, an invitation is extended to the service provider to apply for certification in the network, and in step 204, the process branches, depending on whether the service provider accepts or declines the invitation. If the service provider declines the invitation, then in step 205, the recommending customer is notified, and in step 206, the process terminates. If the service provider accepts the invitation, then in step 210, the service provider specifies a working mode, such as automatic acceptance, require notification, manual decision, etc. See the description of element 302 in FIG. 3 for more information about this function. In step 211, the service provider registers itself into the network and receives a collaboration toolkit that would provide a way for the service provider to interact in an automated way with the network and its customers for setting up meetings, viewing each other's calendars, sending emails, accessing private and public address books and collaborating on the setup process for the customer-network-supplier connection. In step 212, the recommending customer is notified of the service provider's acceptance into the network, and at step 213, the process branches, depending on whether the service provider is certified to provide goods and services to all customers in the network, or only to the recommending customer. If the service provider is certified for only the recommending customer (Yes), the process terminates at step 214. If the service provider is certified for all network customers, the process moves to step 215, where the goods and/or services of this supplier are offered to other network customers, and then to step 216, where the process terminates.

Figure 3:
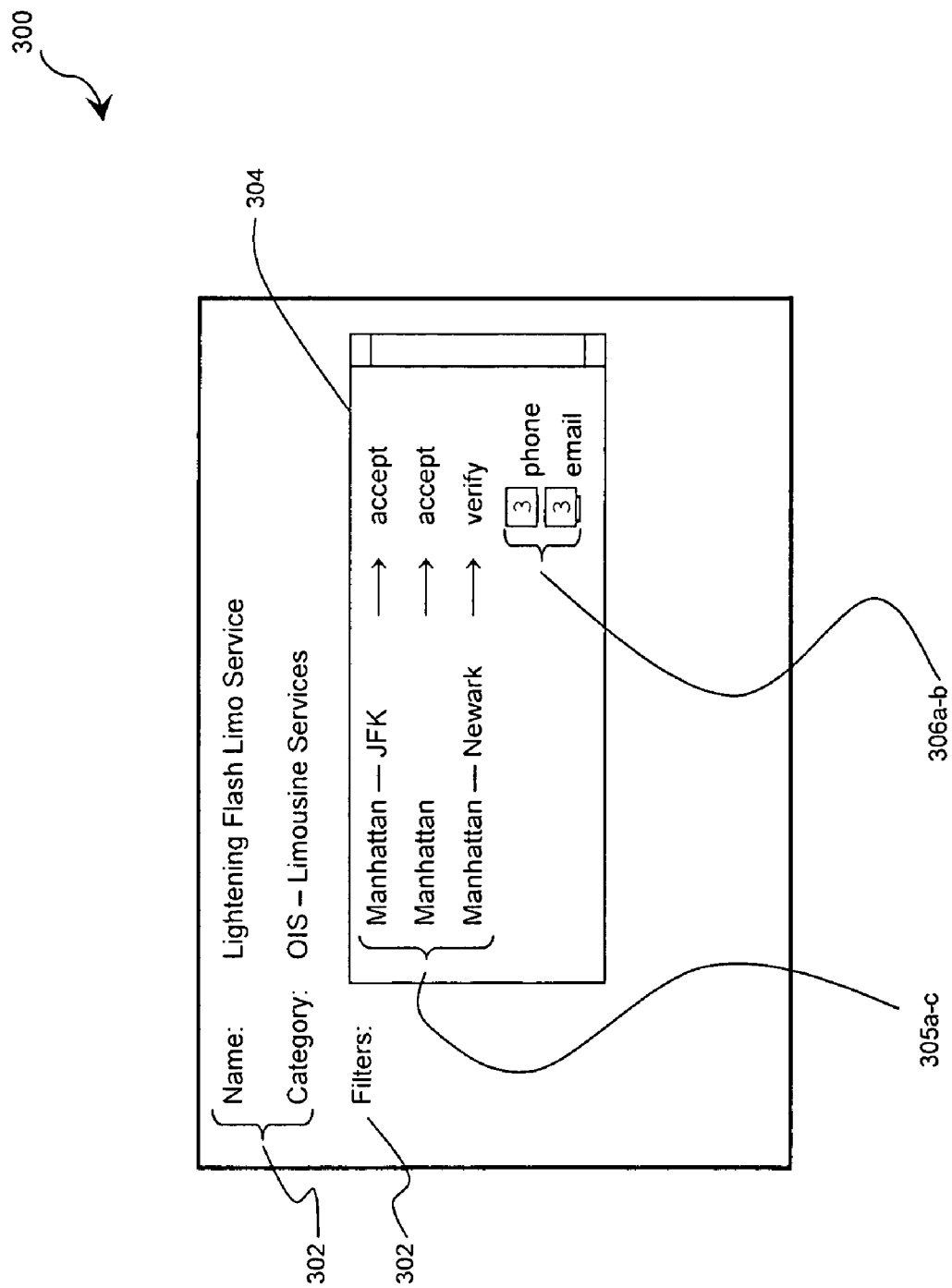
FIG. 3 shows an example of the user interface window 300 on a computer display screen of the software instance that allows a service supplier to chose his working mode, in accordance with one embodiment.

FIG. 3 shows an example of the user interface window 300 on a computer display screen of the software instance that allows a service provider to chose his working mode, as described earlier in FIG. 2, step 210. Window area 301 displays the identification, which in this example is the name and category, of the supplier. Window area 302 is an area that contains tools to parameterize and customize the portal functionality to the needs and requirements of a supplier. In this example a filter approach is shown, using information box 304, which contains the filters for the provider; in this example, the provider is a limousine service, and box 304 contains items 305 a-c, comprising, in this example, two service areas in which customers are accepted (Manhattan-JFK airport and Manhattan itself) and one service area (Manhattan-Newark, N.J.) that requires verification of a service order via items 23-3-6 a-b, in this example, phone and/or email verification. For example, a limo provider could have a rule set in the service supplier transaction portal that allows him to auto-accept all limo reservations within Manhattan, but alert him when transactions come through for New Jersey so he can decide manually. This could be done by sending him an e-mail or text message (aka SMSmessage), to which he could reply a "yes", "no" or for example an acceptance password etc. In other cases, the system could launch a voice call, allowing the provider to answer a "yes" or "no" or password in a voice system, further reducing potential problems, as sending e-mail while driving is not just dangerous, but may be illegal in many places. The rules mentioned above could be used to set pricing terms, geographic and time of day terms etc. In another example, a catering company could set a rule that auto-adds a $20 surcharge for all orders placed for delivery before 7 am.

The system would, on the request of the service provider, analyze past transactions that the supplier has approved/declined to build a predictive model, perhaps build on a decision tree or clustering or similar technologies, and make a recommendation to the supplier to embed as automatic approval/decline filters. The service provider will be able to do what-if analysis on the predictive model before accepting/declining it.

In yet other cases, instead of filters, check boxes or scripts might be used to allow a service provider to configure and customize his RSVP functionality. Though most advantageous for small suppliers in this example, in other cases, it may also be used for larger suppliers. For example, rules may be entered allowing a request to be routed to a specific driver of a larger limo company, based on GPS information and availability of those drivers, etc.

In yet another case, the service provider would be able to post to service supplier platform discounted inventory, that the service supplier could through its network offer it to potential users who may be interested in last-minute discounted services. For example a caterer could offer discounted food after a last minute cancellation, or a limo driver could offer a discounted ride to fill an empty return from the airport etc. Using certain rules and filters, certain customers, that for example registered in some cases, could be notified of such a short term opportunity becoming available, similar to co-pending case U.S. patent application Ser. No. 10/869,356, entitled, "SYSTEM AND METHOD FOR AVAILABILITY-BASED LIMITED-TIME OFFERINGS AND TRANSACTIONS," filed Jun. 15, 2004, incorporated herein by reference.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

It is clear that many modifications and variations of this embodiment may be made by one skilled in the art without departing from the spirit of the novel art of this disclosure.

What is claimed is:

1. A computer implemented method comprising:
providing, via a network connection, a customer access to a set of service providers offered through an Internet-based portal;
receiving a request by the customer for the portal to send an invitation to a new service provider to join the set of service providers offered by the portal;
sending an electronic invitation from the portal to the new service provider and inviting the new service provider to submit a request to join the set of service providers provided by the portal;
receiving by the portal the request from the new service provider to join the set of service providers and performing an evaluation of the new service provider that determines a level of access that is granted to the new service provider to offer services to customers via the portal; and
executing a rule set by the new service provider to accept a first type of service request automatically and to accept a second type of service request only after receipt of a communication from the new service provider manually indicating acceptance.

2. The method of claim 1, wherein the performing the evaluation is one of partially automated or fully automated.

3. The method of claim 2, wherein the determining the level of access includes a first level that provides access to the customer that requested the invitation be sent to the new service provider, and a second level that provides access to additional customers.

4. The method of claim 3, further comprising the portal providing to the new service provider a collaboration toolkit for the new service provider to interact in an automated manner with the portal and the customers of the portal.

5. The method of claim 4, wherein the toolkit is to provide a process for the new service provider to interact in an automated manner with one of the portal and customers for at least one of setting up meetings, viewing calendars, sending emails, accessing private and public address books and collaborating on a setup process for a connection between the customers, the new service provider, and the portal.

6. The method of claim 5, further comprising the portal communicating with a service provider each time a customer wants to make a reservation request with the service provider, wherein the service provider is given a predetermined period of time to respond to the request before the request is rescinded.

7. The method of claim 6, further comprising the portal providing an option for the service provider to set auto-respond rules for the service provider to accept, decline, or request more information in response to a request for service from one or more customers, based on the rules.

8. The method of claim 6, further comprising the portal providing an option for the service provider to set auto-respond rules for the service provider to accept, decline, or request more information in response to a request for service from one or more customers, based on the rules.

9. The method of claim 1, wherein the request for the portal to send the invitation is sent to the portal by a customer of the portal.

10. The method of claim 1, further comprising the portal rejecting or limiting the new service provider's request for access to offer services to customers via the portal because of one or more of a financial status of the new service provider and technology resources of the new service provider.

11. The method of claim 10, further comprising the portal permitting the new service provider to re-apply for more access to customers a predetermined number of times within a predetermined time period, or to reapply following a passage of a predetermined period of time after a request by the new service provider.

12. A machine-readable medium including a set of instructions which when executed by a machine perform a method comprising:
providing, via a network connection, a customer access to a set of service providers offered through an Internet-based portal;
receiving a request by the customer for the portal to send an invitation to a new service provider to join the set of service providers offered by the portal;
sending an electronic invitation from the portal to the new service provider and inviting the new service provider to submit a request to join the set of service providers provided by the portal;
receiving by the portal the request from the new service provider to join the set of service providers and performing an evaluation of the new service provider that determines a level of access that is granted to the new service provider to offer services to customers via the portal; and
executing a rule set by the new service provider to accept a first type of service request automatically and to accept a second type of service request only after receipt of a communication from the new service provider manually indicating acceptance.

13. The machine-readable medium of claim 12 wherein the performing the evaluation is one of partially automated or fully automated.

14. The machine-readable medium of claim 13, wherein the determining the level of access includes a first level that provides access to the customer that requested the invitation be sent to the new service provider, and a second level that provides access to additional customers.

15. The machine-readable medium of claim 14, further comprising the portal providing to the new service provider a collaboration toolkit for the new service provider to interact in an automated manner with the portal and the customers of the portal.

16. The machine-readable medium of claim 12, wherein the request for the portal to send the invitation is sent to the portal by a customer of the portal.

17. A computer system comprising:
   at least one server; and
   a memory unit coupled to the server having stored therein a set of instructions which when executed by the server perform a method comprising:
      providing, via a network connection, a customer access to a set of service providers offered through an Internet-based portal;
      receiving a request by the customer for the portal to send an invitation to a new service provider to join the set of service providers offered by the portal;
      sending an electronic invitation from the portal to the new service provider and inviting the new service provider to submit a request to join the set of service providers provided by the portal;
      receiving by the portal the request from the new service provider to join the set of service providers and performing an evaluation of the new service provider that determines a level of access that is granted to the new service provider to offer services to customers via the portal; and
      executing a rule set by the new service provider to accept a first type of service request automatically and to accept a second type of service request only after receipt of a communication from the new service provider manually indicating acceptance.

18. The system of claim 17, wherein the set of instructions stored on the memory unit of the server, when executed, further perform the method of the portal rejecting or limiting the new service provider's request for access to offer services to customers via the portal because of one or more of a financial status of the new service provider and technology resources of the new service provider.

19. The system of claim 18, wherein the set of instructions stored on the memory unit of the server, when executed, further perform the method of the portal permitting the new service provider to re-apply for more access to customers a predetermined number of times within a predetermined time period, or to reapply following a passage of a predetermined period of time after a request by the new service provider.

20. The system of claim 19, wherein the set of instructions stored on the memory unit of the server, when executed, further perform the method of the portal communicating with a service provider each time a customer wants to make a reservation request with the service provider, wherein the service provider is given a predetermined period of time to respond to the request before the request is rescinded.

21. The system of claim 17, wherein the set of instructions stored on the memory unit of the server, when executed, further perform the method of the portal providing to the new service provider a collaboration toolkit for the new service provider to interact in an automated manner with the portal and the customers of the portal, wherein the toolkit is to provide a process for the new service provider to interact in an automated manner with one of the portal and customers for at least one of setting up meetings, viewing calendars, sending emails, accessing private and public address books and collaborating on a setup process for a connection between the customers, the new service supplier, and the portal.

* * * * *